United States Patent
Saitwal et al.

(10) Patent No.: US 9,349,054 B1
(45) Date of Patent: May 24, 2016

(54) FOREGROUND DETECTOR FOR VIDEO ANALYTICS SYSTEM

(71) Applicant: Behavioral Recognition Systems, Inc., Houston, TX (US)

(72) Inventors: Kishor Adinath Saitwal, Pearland, TX (US); Lon Risinger, Katy, TX (US); Wesley Kenneth Cobb, The Woodlands, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 0 days.

(21) Appl. No.: 14/526,756

(22) Filed: Oct. 29, 2014

(51) Int. Cl.
*G06K 9/34* (2006.01)
*G06K 9/00* (2006.01)
*G06T 7/00* (2006.01)
*G06K 9/62* (2006.01)

(52) U.S. Cl.
CPC ........ *G06K 9/00771* (2013.01); *G06K 9/00711* (2013.01); *G06K 9/6267* (2013.01); *G06T 7/0081* (2013.01); *G06T 2207/10016* (2013.01)

(58) Field of Classification Search
CPC .............. G06T 7/0081; G06T 7/0083; G06T 2207/10016; G06T 2207/20144; G06K 9/6267
See application file for complete search history.

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 7,136,525 B1 | 11/2006 | Toyama et al. | |
| 7,227,893 B1 | 6/2007 | Srinivasa et al. | |
| 7,929,730 B2 * | 4/2011 | Huang | G06T 7/2053 348/155 |
| 8,073,197 B2 * | 12/2011 | Xu | G06K 9/00771 348/169 |
| 8,094,943 B2 | 1/2012 | Eaton et al. | |
| 8,200,011 B2 | 6/2012 | Eaton et al. | |
| 8,218,818 B2 | 7/2012 | Cobb et al. | |
| 8,218,819 B2 | 7/2012 | Cobb et al. | |
| 8,280,158 B2 * | 10/2012 | Adcock | G06K 9/00751 348/14.15 |
| 8,358,834 B2 * | 1/2013 | Cobb | G06K 9/00771 382/155 |
| 8,456,528 B2 * | 6/2013 | Brown | G06K 9/00771 348/169 |

(Continued)

OTHER PUBLICATIONS

International Search Report and Written Opinion for International Application No. PCT/US15/58025; mailed Dec. 21, 2015 (8 pages).

(Continued)

*Primary Examiner* — Amir Alavi
(74) *Attorney, Agent, or Firm* — Patterson & Sheridan, LLP

(57) ABSTRACT

Techniques are disclosed for creating a background model of a scene using both a pixel based approach and a context based approach. The combined approach provides an effective technique for segmenting scene foreground from background in frames of a video stream. Further, this approach can scale to process large numbers of camera feeds simultaneously, e.g., using parallel processing architectures, while still generating an accurate background model. Further, using both a pixel based approach and context based approach ensures that the video analytics system can effectively and efficiently respond to changes in a scene, without overly increasing computational complexity. In addition, techniques are disclosed for updating the background model, from frame-to-frame, by absorbing foreground pixels into the background model via an absorption window, and dynamically updating background/foreground thresholds.

30 Claims, 8 Drawing Sheets

(56) References Cited

U.S. PATENT DOCUMENTS

| | | |
|---|---|---|
| 8,903,167 B2 * | 12/2014 | Kohli .................. G06K 9/6255 382/100 |
| 2004/0151342 A1 | 8/2004 | Venetianer et al. |
| 2004/0228530 A1 | 11/2004 | Schwartz et al. |
| 2004/0239762 A1 | 12/2004 | Porikli et al. |
| 2005/0105765 A1 | 5/2005 | Han et al. |
| 2006/0018516 A1 | 1/2006 | Masoud et al. |
| 2006/0165386 A1 | 7/2006 | Garoutte |
| 2007/0273765 A1 | 11/2007 | Wang et al. |
| 2008/0002856 A1 | 1/2008 | Ma et al. |
| 2008/0181499 A1 | 7/2008 | Yang et al. |
| 2008/0240496 A1 | 10/2008 | Senior |
| 2009/0067716 A1 | 3/2009 | Brown et al. |
| 2009/0297023 A1 | 12/2009 | Lipton et al. |
| 2010/0131442 A1 | 5/2010 | Sheu et al. |
| 2010/0150471 A1 | 6/2010 | Cobb et al. |
| 2010/0201820 A1 | 8/2010 | Lopota et al. |
| 2010/0208986 A1 | 8/2010 | Cobb et al. |
| 2011/0043689 A1 | 2/2011 | Cobb et al. |
| 2011/0044537 A1 | 2/2011 | Cobb et al. |
| 2013/0266185 A1 | 10/2013 | Bulan et al. |
| 2013/0279598 A1 * | 10/2013 | Gomes ............. H04N 19/00945 375/240.24 |
| 2014/0003713 A1 | 1/2014 | Seow et al. |
| 2014/0003720 A1 | 1/2014 | Seow et al. |
| 2014/0015984 A1 | 1/2014 | Seow et al. |
| 2014/0146998 A1 | 5/2014 | Wieser |
| 2015/0310297 A1 | 10/2015 | Li et al. |

OTHER PUBLICATIONS

Apewokin et al. "Multimodal Mean Adaptive Backgrounding for Embedded Real-Time Video Surveillance," Jun. 2007, IEEE 6 pages. Minneapolis, MN US.

Elgammal et al. "Non-parametric Model for Background Substraction," Computer Vision Laboratory, University of Maryland; Jun. 2000; 17 pages, College Park, MD US.

Chris Stauffer et al., "Adaptive background mixture models for real-time tracking," Proceedings IEEE Conference on Computer Vision and Pattern Recognition, 1999: pp. 246-252.

Office Action for corresponding U.S. Appl. No. 14/526,815; dated Jan. 5, 2016 (12 pages).

Office Action for corresponding U.S. Appl. No. 14/526,879; mailed Jan. 7, 2016 (14 pages).

* cited by examiner

FOREGROUND DETECTOR FOR VIDEO ANALYTICS SYSTEM

BACKGROUND OF THE INVENTION

1. Field of the Invention

Embodiments of the invention generally relate to techniques for analyzing digital images. More specifically, embodiments presented herein provide a variety of techniques for effectively and efficiently segmenting foreground and background elements in a stream of video frames trained on a scene.

2. Description of the Related Art

Video analytics generally refers to applications that evaluate digital image data, and a variety of approaches have been developed to programmatically evaluate a video stream. For example, some video analytics systems may be configured to detect a set of pre-defined patterns in a video stream. Many video analytics applications generate a background model to evaluate a video stream. A background model generally represents static elements of a scene within a field-of-view of a video camera. For example, consider a video camera trained on a stretch of roadway. In such a case, the background would include the roadway surface, the medians, any guard rails or other safety devices, and traffic control devices, etc., visible to the camera. The background model may include an expected (or predicted) pixel value (e.g., an RGB or grey scale value) for each pixel of the scene when the background is visible to the camera. The background model provides a predicted image of the scene in which no activity is occurring (e.g., an empty roadway). Conversely, vehicles traveling on the roadway (and any other person or thing engaging in some activity) occlude the background when visible to the camera and represent scene foreground objects.

To process a live camera feed, a background model needs to segment scene foreground and background at or near the same frame rate of a video analytics system. That is, a video analytics system should be able to segment foreground from background for each frame (or every N frames) dynamically while processing a live video feed.

However, a variety of challenges arise in generating a background model. For example, the video channel may be noisy or include compression artifacts. In addition, the nature of the scene itself can make it difficult to generate and maintain an accurate background model. For example, ambient lighting levels can change suddenly, resulting in large groups of pixels being misclassified as depicting foreground. In these cases, it becomes difficult to classify any given pixel from frame-to-frame as depicting background or foreground, (e.g., due to pixel color fluctuations that occur due to camera noise or lighting changes). A background model also needs to respond to gradual changes in scene lighting.

Similarly, some elements of a scene that would preferably be categorized as background can be detected as foreground objects, e.g., a traffic light changing from green to yellow to red or an elevator door opening and closing. The changes can result in elements of the traffic light (as captured in pixel data) being incorrectly classified as depicting scene foreground. Other examples of a dynamic background include periodic motion such as a scene trained on a waterfall or ocean waves or tree branches bending in a breeze. While these changes in the scene are visually apparent as changes in pixel color from frame-to-frame, they should not result in the pixels being classified as elements of scene foreground. Further, as objects enter the scene, they may, effectively, become part of the scene background (e.g., when a car parks in a parking spot). Because other components in a video analytics system may track each foreground object from frame to frame, such false or stale foreground objects waste processing resources and can disrupt other analytics components which rely on an accurate segmentation of scene foreground and background.

One approach to modeling such scenes is to create a complex background model which supports multiple background states per pixel. However, doing so results in a background model where processing requirements scale with the complexity of the scene. This limits the ability of a video analytics system to analyze a large numbers of camera feeds in parallel.

SUMMARY OF THE INVENTION

One embodiment includes a computer-implemented method for generating a background model of a scene depicted in a sequence of video frames captured by a video camera. This method may include receiving a video frame, wherein the video frame includes one or more appearance values for each of a plurality of pixels and classifying each pixel as depicting either foreground or background by comparing the one or more appearance values of each pixel to a background model of the scene. This method may also include performing one or more context based evaluations on one or more of the pixels classified as depicting foreground, wherein the context based evaluations selectively reclassifies one or more of the pixels as depicting foreground or background based on the classification of other pixels in the video frame as depicting either foreground or background.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
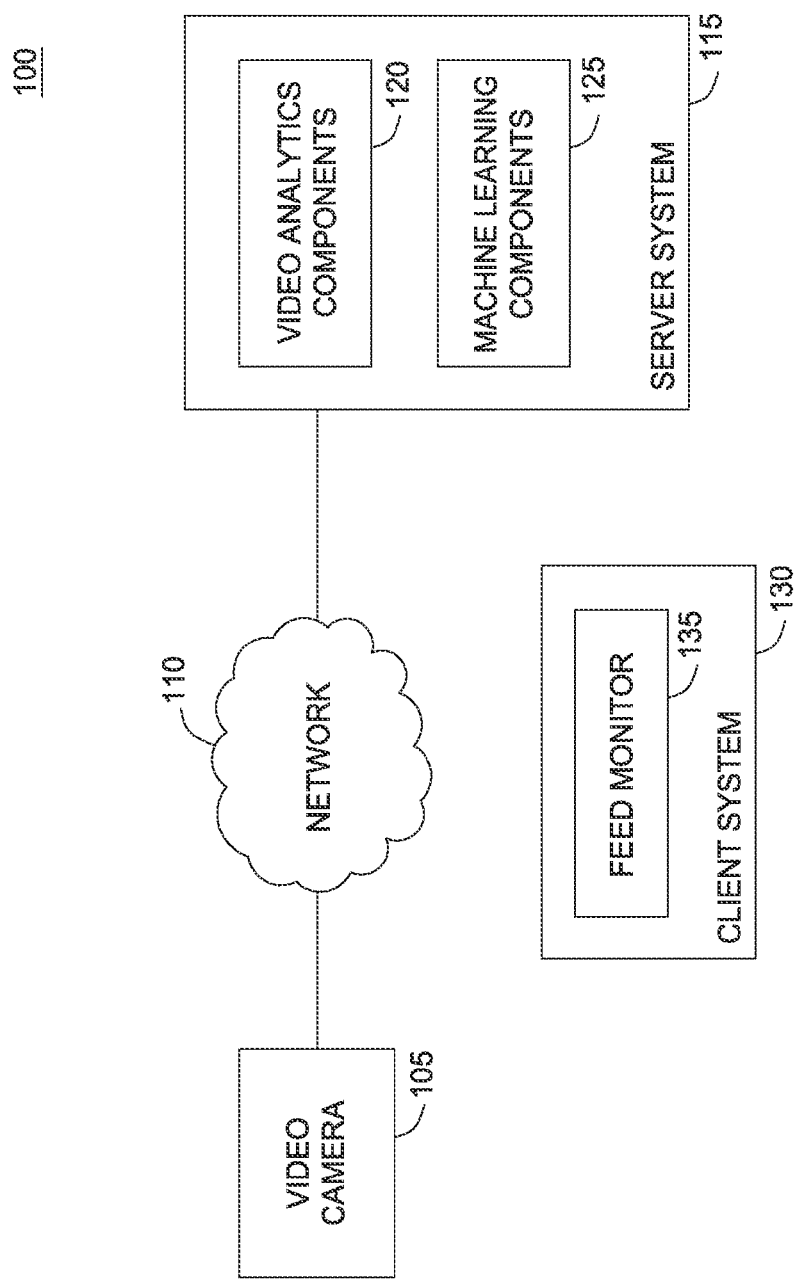
FIG. 1 illustrates components of a video analytics system, according to one embodiment of the invention.

Embodiments of the invention presented herein provide a robust background detector for a video analytics system. More specifically, embodiments of the invention provide techniques for generating and maintaining a background model from image data provided by a video stream. As described below, the background detector is generally configured to generate a background model of a scene captured in recorded video. The background model includes a background image which has color channel (e.g., RGB) values or grayscale brightness values for each pixel in the background image. When a new frame is received, the background detector evaluates pixels to determine whether, in that frame, a pixel depicts an element of background or foreground. Once determined, the background detector may create a background/foreground (BG/FG) mask corresponding to the frame. For example, the BG/FG mask may depict every pixel of foreground as white (e.g., 255 in an 8-bit grayscale) and every pixel of background as black (e.g., 0 in an 8-bit grayscale).

In one embodiment, to generate the BG/FG mask, the background detector evaluates a frame using a pixel based component and a context based component. The pixel based component compares each pixel in the current frame with a corresponding pixel in the background model. Based on a distance between the two pixels, the background detector assigns the pixel as depicting either foreground or background. In addition to a pixel color value, the background model may also include a mean and variance determined, per-pixel, based on the observed distribution of color values received for a given pixel (e.g., distributions determined per color channel for each pixel). In such a case, the distance between a pixel in a current frame and the corresponding pixel in the background model may be determined as a measure of a distance between the pixel color values (e.g., each of the R, G, B values) and the observed distributions—such as a Mahalanobis distance. If the distance exceeds a pre-defined threshold, then the pixel based component sets the pixel as depicting foreground. Otherwise, the pixel based component sets the pixel as depicting background. Note, a constant FG/BG threshold may be ineffective for determining whether a given pixel is a foreground or background. Accordingly, as described below, the threshold may be updated dynamically using a camera noise model. After performing the distance comparisons, the pixel based component provides a candidate BG/FG mask, where each pixel has an assigned background or foreground state.

After the pixel based evaluation, the context based component refines the candidate background/foreground image. In one embodiment, the context based component may perform a series of morphological operations on each pixel assigned as foreground. For example, the context based component may dilate foreground pixels in the candidate BG/FG mask. Doing so converts nearby pixels assigned as background to foreground, particularly where multiple dilated pixels overlap on a pixel classified as background. In addition, the context based component may erode foreground pixels. Doing so may convert small areas of foreground to background, e.g., in cases where the foreground assignment was the result of a compression or noise artifact.

After performing the morphological operations, the FG/BG mask is used to identify contiguous regions of foreground in the current frame. Each such region represents a foreground object or "blob" in the current frame. In one embodiment, the context based component compares foreground objects in the current frame (represented by a defined region of pixels) with a corresponding region of pixels in a background image represented by the mean-image within background model. For example, the context based component may determine a normalized cross-correlation between the groups of pixels. If pixels classified as foreground have changed in a similar manner relative to one another (i.e., the pixel colors have all shifted in a similar manner), then the context based component may reclassify the entire blob as background. Doing so may address issues of lighting changes that result in a region being misclassified as foreground, without the computational expense of maintaining multi-state background models. The remaining foreground objects are treated as "true" foreground by the video analytics system.

After identifying a group of foreground objects in the current frame, the video analytics system updates the background model based on the pixel values of the current frame and on the determination of foreground and background. For pixels in the current frame assigned as depicting background, the color channel values of such pixels are used to incrementally update the mean and variance of the corresponding pixels in the background model. In one embodiment, exponential weights are used in order to give more weight to more recent background samples than older samples. That is, the color values of the most recent frames make a greater contribution to the pixel values of the background model.

In one embodiment, the color values of pixels classified as depicting foreground are absorbed into the background model. That is, with each frame, the raw color values of each foreground pixel contribute to an update of the background model for that frame. Specifically, the values of a pixel classified as foreground are used to update the mean associated with that pixel in the background model, but the variance remains unchanged. For pixels in the current frame detected as foreground, the pixel value is absorbed into the mean of the corresponding pixel in the background model based on an observed likelihood (i.e., a frequency) of that pixel being classified as foreground over a recent-history window and a set of user-specified parameters. The higher the frequency at which a pixel is classified as foreground, the lower the absorption rate.

Over a number of frames, if a foreground object continues to remain relatively stationary, the mean will eventually change to where the pixel is no longer classified as foreground. Thus, foreground objects may be said to be slowly absorbed into the background model. Once absorbed, pixels in subsequent frames now classified as background are used to update both the mean and the variance of the corresponding in the background model. Doing so allows the background model to "pull" elements of foreground into background, preventing "stale" background objects from interfering with the video analytics system.

For example, assume a camera is trained on a parking lot. When a car appears, the video analytics system may classify pixels in which the car appears as depicting foreground. While the car moves in the parking lot, particularly in a roadway where other cars frequently appear as well, the absorption rate is lower relative to other regions within the field-of-view of the camera (e.g., regions depicting a parking stall). When the car pulls into a parking stall and stops moving, the color values of the pixels are pulled into the background more rapidly, as such pixels may have a low-frequency of being classified as foreground. That is, the mean of the pixels depicting the car may change more quickly to absorb the car as a new part of the background state.

Advantageously, identifying foreground and background using both pixel based and context based evaluations provides an effective technique for segmenting scene foreground from background in a video stream. Further, this approach can scale to process large numbers of camera feeds simultaneously, e.g., using parallel processing architectures. Further still, the approaches for incrementally updating the mean and variance for pixels in the background model, absorbing foreground pixels into the background model via an absorption window, and dynamically updating background/foreground thresholds used by the pixel based component collectively ensure that the video analytics system can effectively and efficiently respond to changes in a scene, without overly increasing computational complexity. Thus, embodiments presented herein can detect scene foreground and background within the constraints required to process a video feed in real-time for a large number of cameras.

FIG. 1 illustrates a network computing environment 100, according to one embodiment of the invention. As shown, the network computing environment 100 includes a video camera 105, a network 110, and a server computer system 115. The network 110 may transmit video data recorded by the video camera 105 to the server system 115. Of course, the video camera 105 could be connected to the server system 115 directly (e.g., via USB or other form of connecting cable). Network 110 receives video data (e.g., video stream(s), video images, or the like) from the video camera 105. In addition to a live feed provided by the video camera 105, the server system 115 could also receive a video stream from other input sources, e.g., a VCR, DVR, DVD, computer, web-cam device, or the like.

As an example, assume the video camera 105 is one of multiple video surveillance cameras 105 used to monitor an enterprise campus. In such a case, each video camera 105 would be trained at a certain area (e.g., a parking lot, a roadway, a building entrance, etc.). And each video camera 115 would provide a streaming video feed analyzed independently by the server system 115. Generally, the area visible to the video camera 105 is referred to as the "scene." The video camera 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value (e.g., a radiance value between 0-255). Further, the video stream may be encoded using known such formats e.g., MPEG2, MJPEG, MPEG4, H.263, H.264, and the like.

In one embodiment, the server system 115 includes video analytics components (e.g., hardware and software applications) used to analyze the video stream received from the video camera 105. In addition to segmenting scene foreground from background, the video analytics components 120 may be configured to classify foreground objects, derive metadata describing the appearance, actions, and/or interactions of such objects (based on changes in pixel color values from frame to frame). The resulting video analytics metadata may be used for a variety of applications. For example, in one embodiment, the output of the video analytics components 120 may be supplied to a machine-learning engine 125. In turn, the machine-learning engine 125 may be configured to evaluate, observe, learn and remember details regarding events (and types of events) that occur within the scene. When observations differ from the learned behavior, the system can generate an alert.

In one embodiment, the video analytics component 120 may normalize the metadata derived from observations of foreground objects into numerical values (e.g., to values falling within a range from 0 to 1 with respect to a given data type). For example, the metadata could include values for multiple features of each foreground object (e.g., values for a height and width in pixels, color, shape, appearance features, etc.). In turn, each value type could be modeled as a statistical distribution between 0 and 1. The video analytics component 120 then packages the resulting normalized values as feature vector. The resulting feature vectors of each foreground objects then provided to the machine learning components 125 for each frame.

In one embodiment, the machine learning components 125 include a neuro-linguistic module that performs neural network-based linguistic analysis of the feature vectors. To generate the model, the machine learning components 125 receive normalized data values and organize the vectors into clusters. Further, the neuro-linguistic module may assign a symbol, e.g., letters, to each cluster which reaches some measure of statistical significance. From the letters, the neuro-linguistic module builds a dictionary of observed combinations of symbols, i.e., words based on a statistical distribution of symbols identified in the input data. Specifically, the neuro-linguistic module may identify patterns of symbols in the input data at different frequencies of occurrence, up to a maximum word size (e.g., 5 letters). The most frequently observed words (e.g., 20) provide a dictionary of words corresponding to the video stream. Using words from the dictionary, the neuro-linguistic module generates phrases based on probabilistic relationships of each word occurring in sequence relative to other words, up to a maximum phrase length. For example, the neuro-linguistic module may identify a relationship between a given three-letter word that frequently appears in sequence with a given four-letter word, and so on. The syntax allows the machine learning components 125 to learn, identify, and recognize patterns of behavior without the aid or guidance of predefined activities. Thus, unlike a rules-based video surveillance system, which relies on predefined patterns to identify or search for in a video stream, the machine learning components 125 learn patterns by generalizing input and building memories of what is observed. Over time, the machine learning components 125 use these memories to distinguish between normal and anomalous behavior reflected in observed data.

For instance, the neuro-linguistic module builds letters, words (nouns, adjectives, verbs, etc.), phrases, and estimates an "unusualness score" for each identified letter, word, or phrase. The unusualness score (for a letter, word, or phrase observed in input data) indicates how infrequently the letter, word, or phrase has occurred relative to past observations. Thus, the behavior recognition system may use the unusualness scores to both identify and measure how unusual a current syntax is relative to a stable model of symbols (i.e., letters), a stable model of words built from the symbols (i.e., the dictionary) and a stable model of phrase built from the words (i.e., the syntax)—collectively the neuro-linguistic model. In addition, as the neuro-linguistic module receives more input data, the neuro-linguistic module may decay, reinforce, and generate letters, words, and syntax phrases over time. In parlance with the machine learning field, the neuro-linguistic module "learns on-line" as new data is received and occurrences increase, decrease, or appear.

In general, the video analytics component 120 and machine-learning components 125 both process video data in real-time. However, time scales for processing information by the video analytics component 120 and the machine-learning component 125 may differ. For example, in one embodiment, the video analytics component 120 processes video data frame-by-frame, while the machine-learning component 125 processes data every N-frames.

Note, however, FIG. 1 illustrates merely one possible arrangement of a network computing environment 100 which includes a video analytics component 120. For example, although the video camera 105 is shown connected to the computer system 115 via the network 110, the video camera 105 could also be connected directly to the server system 115. Further, various components and modules of the server system 115 may be implemented in other systems. For example, the video analytics component 120 could be implemented as part of a video input device (e.g., as a firmware component integrated with a video camera 105). In such a case, the output of the video camera 105 may be provided to the machine learning components 125 on the server 115. Similarly, the output from the video analytics component 120 and machine-learning component 125 may be supplied to other computer systems. For example, the video analytics component 120 and machine learning component 125 may process video from multiple input sources (i.e., from multiple cameras). In such a case, a feed monitor 135 running on client system 130 provides an application used to monitor and control streaming feeds evaluated by the video components 120 and/or the machine learning component 125.

Figure 2:
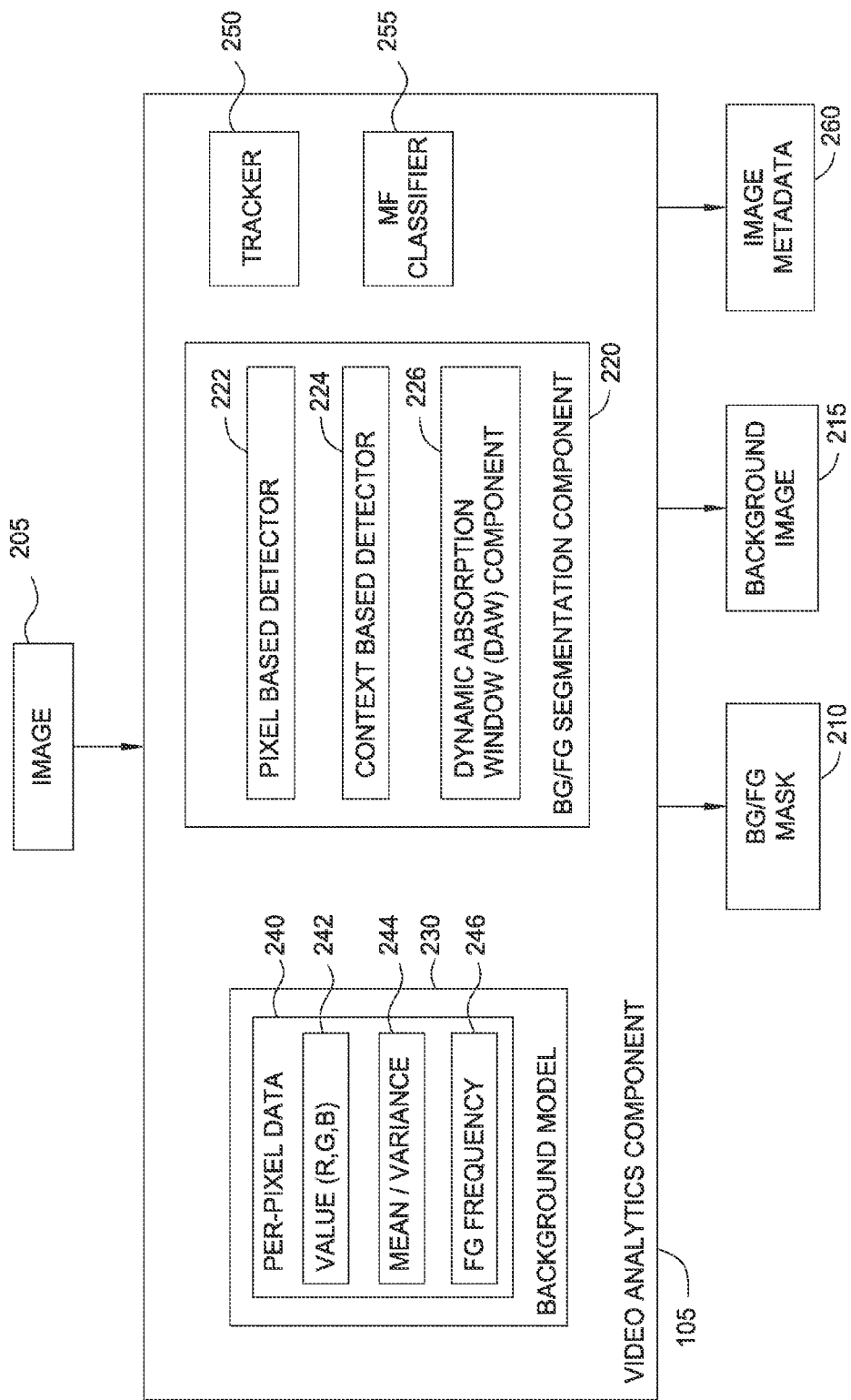
FIG. 2 further illustrates components of the video analytics system shown in FIG. 1, according to one embodiment.

FIG. 2 further illustrates the video analytics component 105 first shown in FIG. 1, according to one embodiment. As shown, the video analytics component 105 includes a background foreground (BG/FG) segmentation component 220, a background model 230, a tracker component 250 and a micro-feature (MF) classifier 255. Image 205 represents an incoming frame of video received from a video camera. As also shown, the background model 230 includes per-pixel data 240. Specifically, the per-pixel data 240 includes a color value 242, a mean and variance 244, and a foreground frequency 246 for each pixel in the background model 230.

The image 205 provides color channel values (e.g., RGB values) for each pixel in a frame of streaming video. Once received, the background foreground (BG/FG) segmentation component 220 generates a BG/FG mask 210 identifying which pixels depict foreground and which pixels depict background in the image 205, based on the background model 230. In addition, the BG/FG segmentation component 220 outputs a background image 215 and image metadata 260, as well as updates the background model 230.

In one embodiment, to generate the BG/FG mask 210 for the current streaming video frame (i.e., for image 205), the BG/FG segmentation component 220 evaluates the image 205 using both a pixel based detector 222 and a context based detector 224. The pixel based detector 222 evaluates each pixel in the image 205 relative to a corresponding pixel in the background model 230. Specifically, the pixel based detector 222 determines a measure of distance between the pixel in the image 205 and the corresponding pixel 242 in the background model. In one embodiment, the distance using may be determined as a Mahalanobis distance, per color channel. Of course other distance measure could be used or developed for a particular case. In embodiments using the Mahalanobis distance measure, the pixel based detector 222 determines a distance between the pixel in the image and a distribution of the observed distribution of values for that pixel in the red, blue, and green color channels maintained by background model 230. In addition, the per-pixel data 240 includes a mean and variance 244 for each color distribution used in calculating the Mahalanobis distance.

The distance is compared to a threshold to determine whether to classify the pixel as depicting foreground or background (at least according to the evaluation done by the pixel based detector 222). In one embodiment, the threshold is determined as a dynamic value updated based on a camera noise model, defined as follows:

$$\text{mean\_gray} = 0.299 * \text{red mean value} + 0.587 * \text{green mean value} + 0.114 * \text{blue-mean-value} \quad \text{(Eq. 1)}$$

The mean_gray value provides a gray-level representation of mean (R, G, B) values for that pixel in 244. This equation converts the three channel color value to gray-scale (luminance) value with the above constant coefficients. The mean_gray value may then be used to compute the dynamic threshold as follows:

$$\text{threshold} = \text{min\_threshold} + (\text{max\_threshold} - \text{min\_threshold}) * (\text{mean\_gray} - 255) \quad \text{(Eq. 2)}.$$

While the min_threshold and max_threshold values may be set as a matter of user preference, values of min_threshold=16 and max_threshold=80 have proven to be effective in some cases. Further, the thresholds could be defined differently for different regions of the scene and other formulas for computing a threshold could be used as well. Of course, a static threshold could be used in some cases.

The output of the pixel based detector 222 is a candidate background image specifying a classification of each pixel in image 205 as depicting scene foreground or background, relative to the background model 230. The context based detector uses the state of neighboring pixels, i.e., context, of a pixel to refine candidate background/foreground image. Stated differently, the context based detector 224 selectively reclassifies one or more of the pixels as depicting foreground or background based on the classifications of other in the image 205 as depicting either foreground or background. In one embodiment, the context based detector 224 evaluates the pixels in the candidate background/foreground image and refines the assignment of pixels assigned as foreground and background. More specifically, the context based detector 224 may perform a series of morphological operations on pixels assigned as foreground. For example, context based detector 224 may perform a dilation operation on foreground pixels, expanding the size of such pixels. Pixels classified as background, but covered by a threshold number of foreground pixels are converted to foreground. While the threshold can be as low as one, a dilate window of 5×5 has proven to be effective. Doing so may convert small "islands" of background surrounded by foreground pixels to foreground.

In addition, the context based detector may perform erosion operations on pixels classified as foreground (or converted to foreground by dilation operations). Specifically the erosion operation may covert small connected groups of pixels assigned as being foreground to background. For example, the erosion operation may convert any foreground blob having X pixels or less to background. While the threshold can be as low as one, a erode window of 3×3 has proven to be effective. Doing so helps reduce camera noise or compression artifacts from creating small foreground objects.

After performing the morphological operations, the context based detector identifies contiguous regions of pixels that remain classified as foreground. Such regions may be referred to as "foreground blobs" or "foreground objects." Each foreground blob is then compared with the corresponding region in the background image 215. The background image 210 is composed of the RGB values 242 for each pixel in the background module. Stated differently, the background image 215 provides an image that presents the scene as though only scene background is visible to the camera—an "empty stage." In one embodiment, the context based detector 224 performs a normalized cross-correlation operation to compare a foreground object in the image 205 and the corresponding region of pixels in the background image 215. If the two regions are highly correlated, the region classified as foreground may be the result of lighting changes in the scene and not the presence of a foreground object. (Note that the normalized cross-correlation gives the values in the range of [−1.0, 1.0] and any value above 0.9 is proven to be effective threshold indicating high correlation.) And the context based detector 224 may classify the pixels included in that foreground object as depicting background in the BG/FG mask.

After performing the operations of the pixel based detector 222 and context based detector 224, the resulting BG/FG mask 210 identifies the final determination of foreground and background for the image 205. In addition, the BG/FG segmentation component 220 may update the background model 230 based on the image 204 and the resulting BG/FG mask 210. For each pixel in BG/FG mask 210 classified as background, the RGB values for the corresponding pixel in the image are used to incrementally update the mean and variance 244 in background model 230. In particular, exponential weights are used in order to give more weight to recent values of that pixel in previous frames. A pseudo-code example of updating the background model of the mean and variance for a red, blue, and green color channel is given below:

TABLE I

Incremental update of mean and variance for background (BG) pixels

```
for (int i = 0; i < 3; ++i)
{
    diff = raw[i] − bg_mean[i]
    incr = alpha * diff
    bg_mean[i] = bg_mean[i] + incr
    bg_variance[i] = (1 − alpha) * (bg_variance[i] + diff * incr)
}
``` alpha is a user-defined parameter defining an exponential weight for the background samples. While the value may be set as a matter of preference, a value of 0.02 has proven to be effective.

After updating the mean and variance 244 of each pixel classified as background, the BG/FG component also updates the background model 230 based on the color channel values of each pixel classified as foreground. As noted above, foreground objects are slowly absorbed into the background, based on the frequency at which the pixels of that foreground object are classified as foreground (i.e., based on FG frequency 246). As an example, assume a camera trained on a parking lot, when a car parks (and following any passengers emerging), the color values of the pixels depicting the car are "absorbed" into the background model. Specifically, in one embodiment, the color values of pixels depicting the car are used to update only the mean 244 of the corresponding pixels in the background model 230. An absorption factor (i.e., the rate at which the pixel color values of a foreground object are absorbed into the background) may be derived from the observed likelihood of a pixel being classified as foreground. A pseudo-code example of updating the background model of the mean and variance for a red, blue, and green color channel is given below:

TABLE II

Absorption of foreground (FG) pixels within background (BG) model

```
likelihood = fg_samples / total_samples;
bg_window = min_window + (likelihood / max_likelihood) *
    (max_window − min_window);
absorb_rate = 1 / (beta * bg_window)
```

TABLE II-continued

Absorption of foreground (FG) pixels within background (BG) model

```
for (int i = 0; i < 3; ++i)
{
    bg_mean[i] = absorb_rate * (raw[i] − bg_mean[i])
}
```

In this example, the min_window (e.g., 10 seconds), max_window (e.g., 600 seconds), max_likelihood (e.g., 0.25) and beta (e.g., 10) are user-defined parameters. Note, as the FG likelihood increases, the BG window increases and FG absorption decreases. Stated differently, the absorption factor and the foreground frequency are inversely proportional to one another.

Additionally, while the background component determines a BG/FG mask and a collection of foreground objects independently from frame-to-frame, the tracker 250 provides a component configured to identify and track foreground objects from one frame to the next. For example, the tracker 250 may use optical flow, contour, or feature based tracking methods to identify an object across a sequence of frames. That is, the tracker 250 may receive the foreground blobs from the image 205 and generate computational models for each blobs. For example, the tracker 250 may receive each successive frame of raw-video (i.e., image 205) along with the BG/FG mask 219 and attempt to track the motion of, for example, a car depicted by a given foreground patch as it moves through the scene. That is, the tracker 250 provides continuity to other elements of the video analytics component 105 by tracking the car from frame-to-frame. Over time, the tracker 250 builds a trajectory of a foreground object as it appears, moves through the scene, and eventually exits (or is absorbed into the background). The resulting trajectories may be evaluated by a variety of tools, e.g., to first learn expected patterns of trajectories, and subsequently to identify unusual trajectories (e.g., a car going the wrong way) or unusual interactions between trajectories (e.g., two cars colliding).

The MF classifier 255 may also calculate a variety of kinematic and/or appearance features of a foreground object, e.g., size, height, width, area (in pixels), reflectivity, shininess, rigidity, speed, velocity, etc. In one embodiment, the resulting values may be normalized to a value between 0 and 1, packaged as a feature vector (along with an object ID), and output by the video analytics component 105 as image metadata 260.

After evaluating the image 205 to derive the BG/FG mask 219 and updating background model 230, the video analytics component 105 can repeat the process for the next frame of video.

Figure 3:
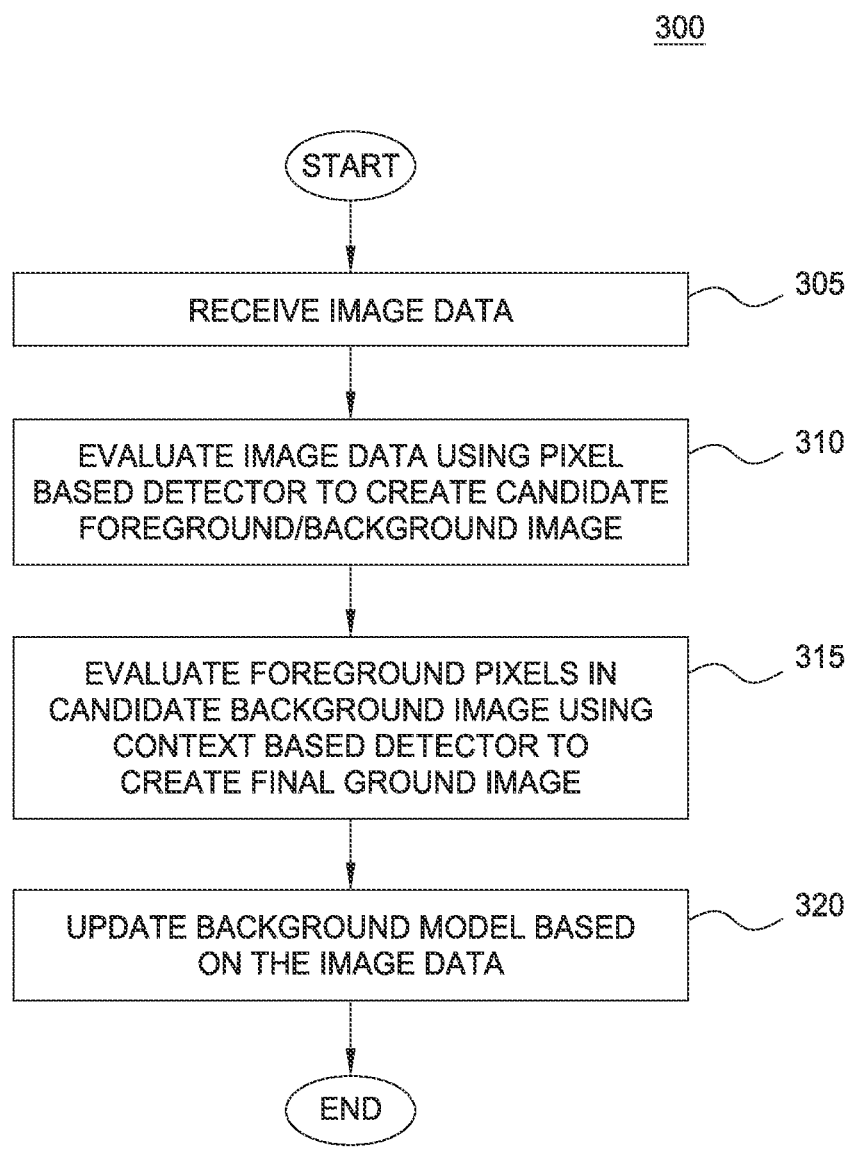
FIG. 3 illustrates method for segmenting scene foreground and background using a combined pixel-based and context-based evaluation, according to one embodiment.

FIG. 3 illustrates method 300 for segmenting scene foreground and background using a combined pixel-based and context-based evaluation, according to one embodiment. As shown, the method 300 begins at step 305, where the video analytics component 105 receives image data, e.g., a current frame of video from a streaming camera feed. At step 310, the pixel based detector determines a distance between each pixel in the image data and a corresponding pixel in the background model. As noted, in one embodiment, the distance may be determined as a measure of a distance between the pixel color values (e.g., each of the R, G, B values) and the observed distribution of color values for that pixel (i.e., a Mahalanobis distance). Each pixel with a distance from the background model that exceeds a dynamic threshold is classified as depicting foreground, resulting in a candidate background image (i.e., a BG/FG mask).

At step 315, the context based detector refines the candidate background image using morphological operations to dilate and erode foreground pixels. After performing such operations, the context based detector identifies each remaining foreground blob and compares it to the corresponding region in the background image maintained by the background model (i.e., an image based made up of the predicted background color value for each pixel). Following step 315, the final classification of each pixel as background or foreground provides a BG/FG mask of background and foreground for that frame. At step 320, the video analytics component updates the background model based on the pixel color values of the image data received at step 305 and the classification of each pixel as depicting foreground or background. As noted, for pixels classified as background, a mean and variance of a distribution of color values for each color channel is updated. For example, the incremental update approach set forth above may be used. In addition, for each pixel associated as foreground, the mean of each color channel distribution in the background model is updated. For example, the dynamic absorption window approach discussed above may be used.

Figure 4:
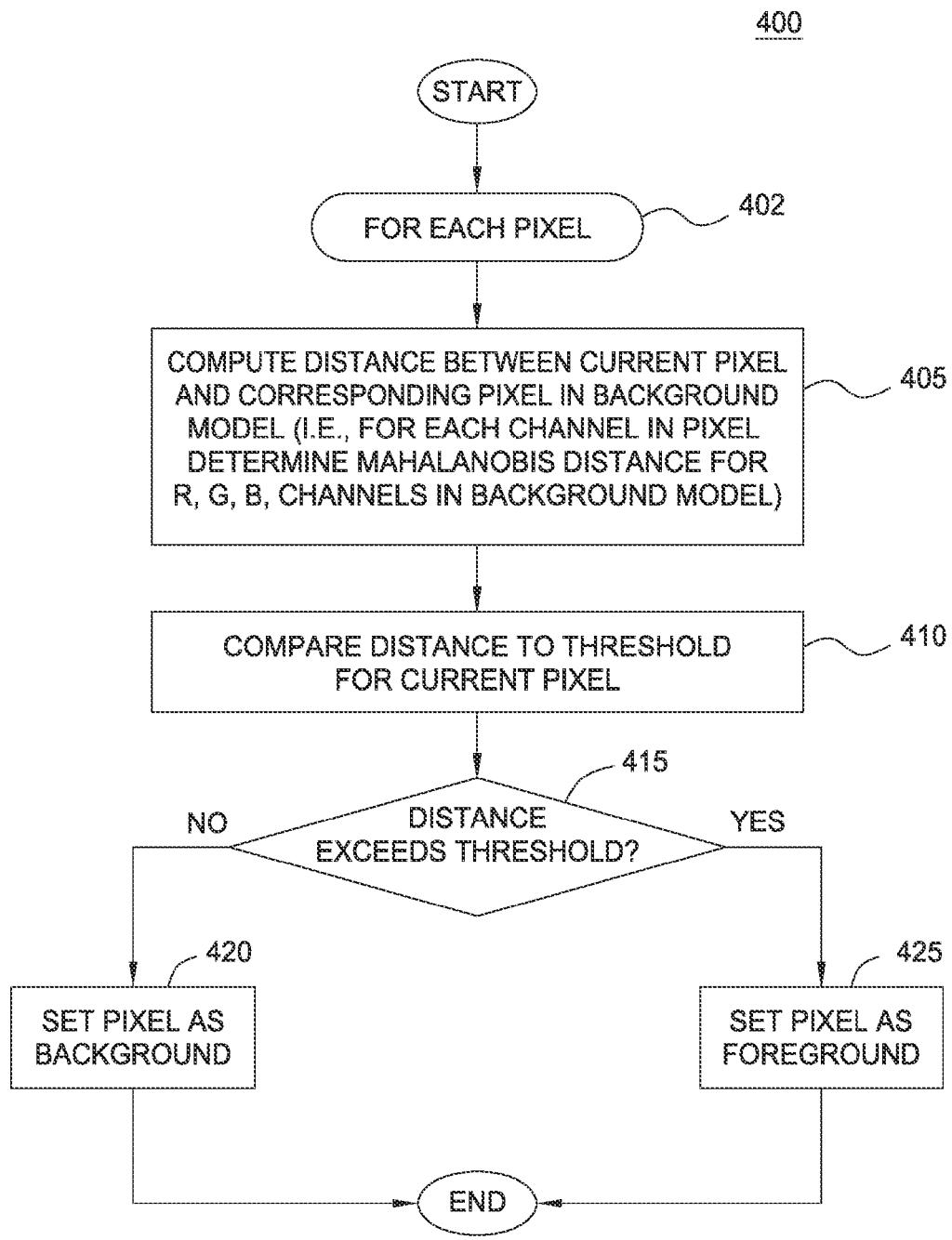
FIG. 4 illustrates a method for a generating a candidate BG/FG mask using a pixel based component, according to one embodiment of the invention.
Figure 5:
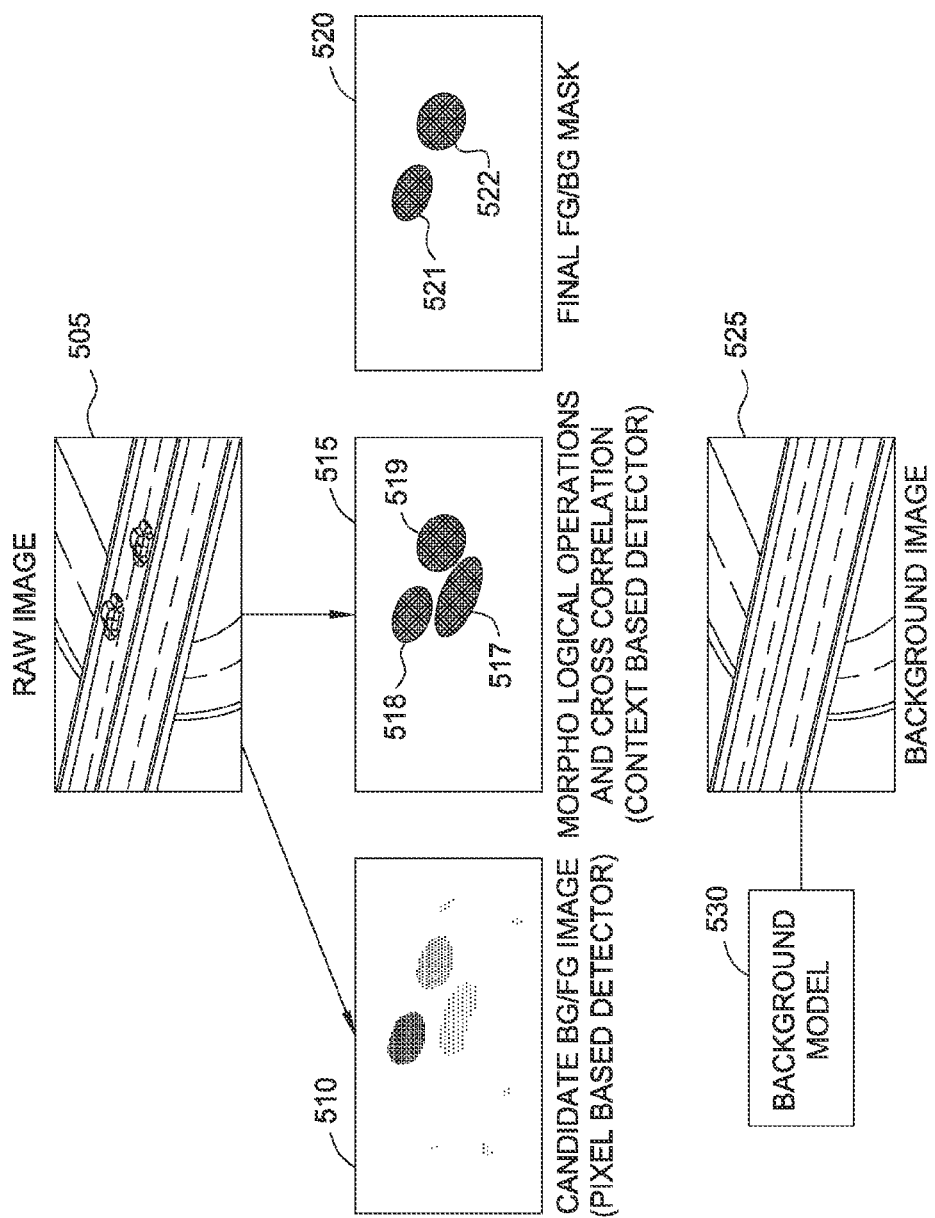
FIG. 5 illustrates examples of image data generated for a current frame, according to one embodiment.

FIG. 4 illustrates a method 400 for a generating a candidate BG/FG mask using a pixel based component, according to one embodiment of the invention. As shown, the method begins at step 405 where the pixel based component computes a distance (e.g., a Mahalanobis distance) between a current pixel and a corresponding pixel model maintained by the background model. At step 410, the pixel based component compares this distance to a dynamic threshold determined for the current pixel. At step 415, the pixel based component determines whether the distance exceeds the threshold. If not, at step 420, the pixel is classified as depicting background. Otherwise, the pixel is classified as depicting foreground. The method 400 ends after each pixel is evaluated and classified as depicting scene foreground or background. FIG. 5 illustrates a candidate background image 510 generated by the pixel based detector a raw image 505 and a background model 530. As shown, each pixel classified as depicting foreground is represented by a black dot. Three relatively dense regions of pixels can be observed, along with a number of other small regions of one or two foreground pixels.

Figure 6:
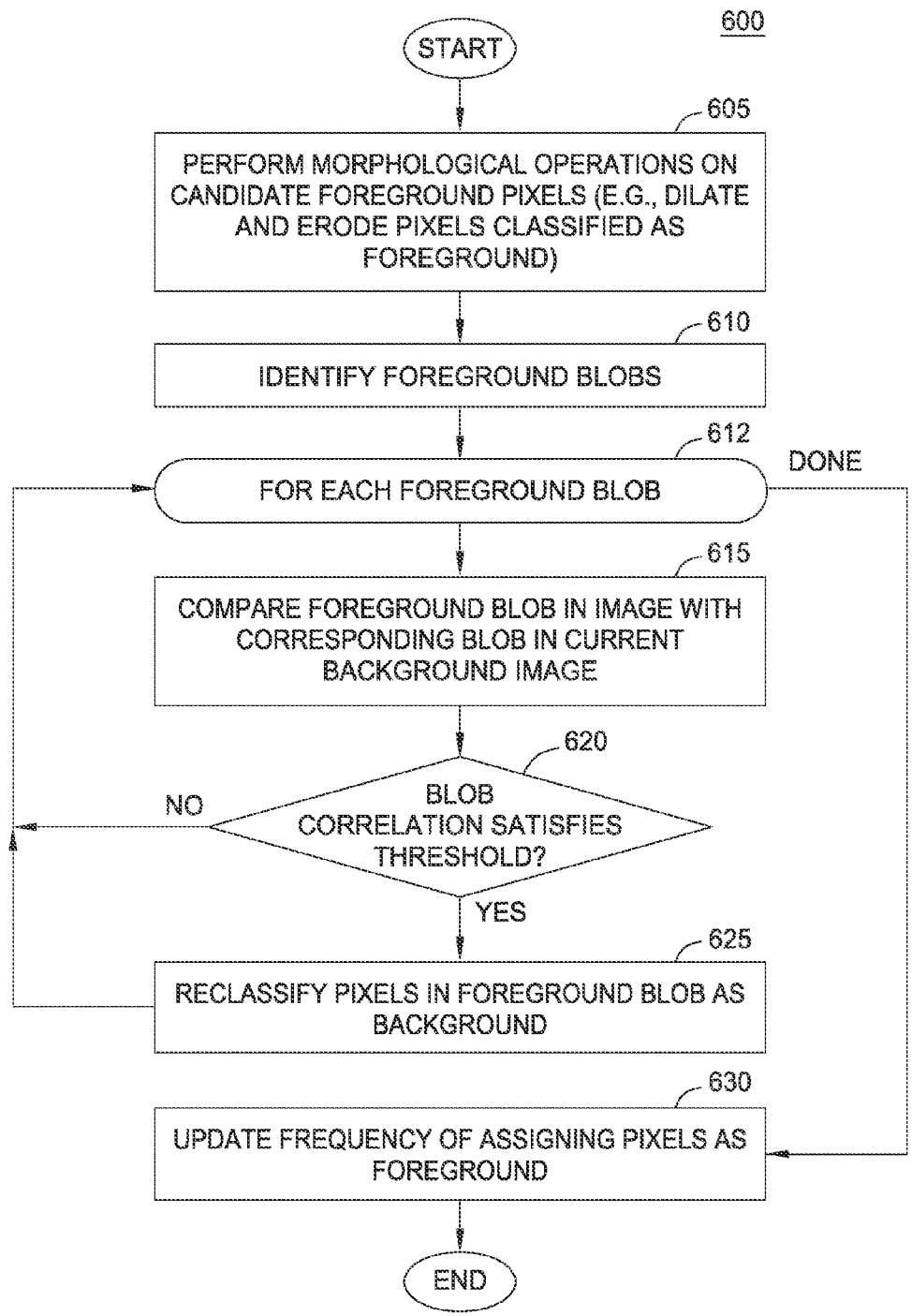
FIG. 6 illustrates a method for a refining the candidate BG/FG mask using a context based component, according to one embodiment of the invention.

After generating the candidate BG/FG image, the context based detector refines this image to determine a final BG/FG mask 520. FIG. 6 illustrates a method 600 for refining the candidate BG/FG mask using a context based component, according to one embodiment of the invention. As shown, the method 600 begins at step 605 where the context based detector performs morphological operations to dilate and erode pixels classified as foreground. As described, the dilation of foreground pixels may result in neighboring pixels, then classified as background, being converted to foreground. And the erosion of foreground may convert small, isolated patches of foreground into background. For example, image 515 of FIG. 5 shows candidate BG/FG image 510 after being refined using the morphological operations. As can be seen in image, 515 dilating the three dense regions of foreground pixels in image 510 results in three contiguous regions 517, 518, and 519. Conversely, many of the small regions of one or two foreground pixels have been eroded away.

At step 610, the BG/FG segmentation component identifies foreground blobs that remain after the morphological operations of step 605 (e.g., regions 517, 518, and 519 of image 515). Following step 605, a loop begins to evaluate each foreground blob. At step 615, the context based component compares a region of the video frame defined by a current foreground blob with a corresponding region in the background image. As noted, normalized cross correlation techniques may be used to determine how correlated the changes in pixel values in the current image are relative to the corresponding pixels in the background image. At step 620, if a correlation threshold is satisfied, then the pixels in that region are reclassified as depicting background in the current frame and the initial assignment of foreground is presumed to be the result of a lighting change. Otherwise, the pixels in the foreground region under consideration remain classified as foreground. For example foreground regions 518 and 519 (which each correspond to a car in the raw image 505) would be expected to have a relatively weak normalized cross correlation score and remain as foreground regions 521 and 522 in the final BG/FG mask 520. However, region 517 would be expected to have a relatively high normalized cross correlation score and be reclassified as background. This result is depicted in the final BG/FG mask 520, which includes foreground objects 521 and 522, corresponding to regions 518 and 519 in image 515, but the pixels of region 517 have been reclassified as background.

Figure 7:
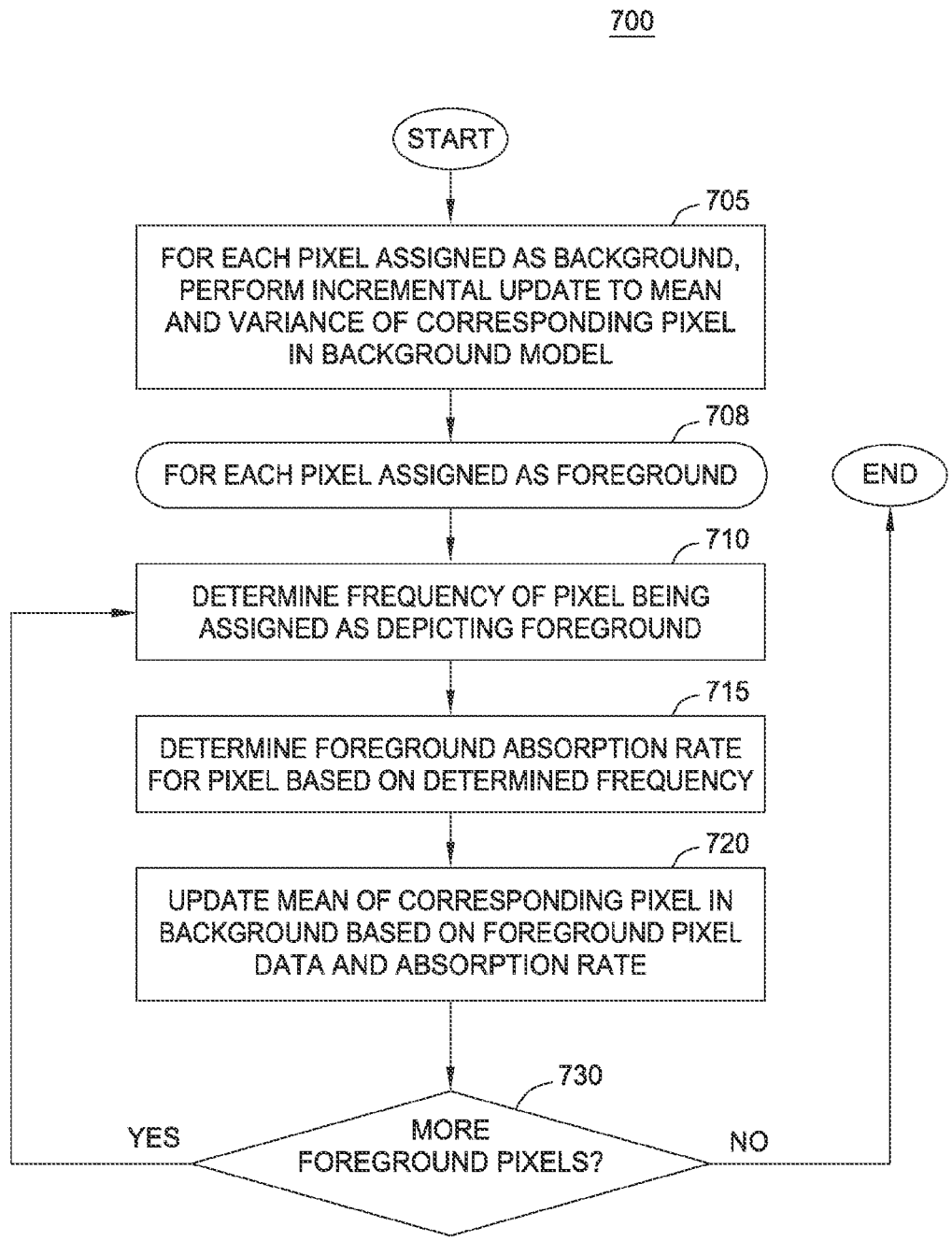
FIG. 7 illustrates a method to update a background model, according to one embodiment of the invention.

FIG. 7 illustrates a method 700 for updating a background model, according to one embodiment of the invention. The method 700 may be performed after a current video frame of a video stream has been segmented into background and foreground using the techniques discussed above. The method 700 begins at step 705, where the mean and variance of each pixel classified as depicting background are updated based on the color channel values of the pixel in the current frame. As noted, the background model may maintain a distribution of pixel values for each pixel, along with a mean and variance related to the distribution. Further, the update to the mean and variance may use exponential weights to give more weight to more recent background samples than older samples.

Following step 705, a loop begins to absorb a portion of each foreground pixel into the background using a dynamic absorption factor. First, at step 710, the system determines a frequency at which the current pixel has been classified as foreground. Note, the frequency may be determined relative to a configure window of past frames, e.g., over the previous 1000 frames. At step 715, the system determines a dynamic absorption factor as described above. Again, the more frequent the pixel is classified as foreground (i.e., the more active that region of the frame), the lower the absorption rate. At step 720, the system updates the mean for the pixel in the background model based on the color value of the pixel in the current frame and the absorption factor. Again, the update to the background model leaves the variance unchanged. At step 730, if additional foreground pixels remain to be absorbed into the background model, then the method returns to step 710 and the loop repeats for the next foreground pixels. Otherwise, the method 700 ends.

Figure 8:
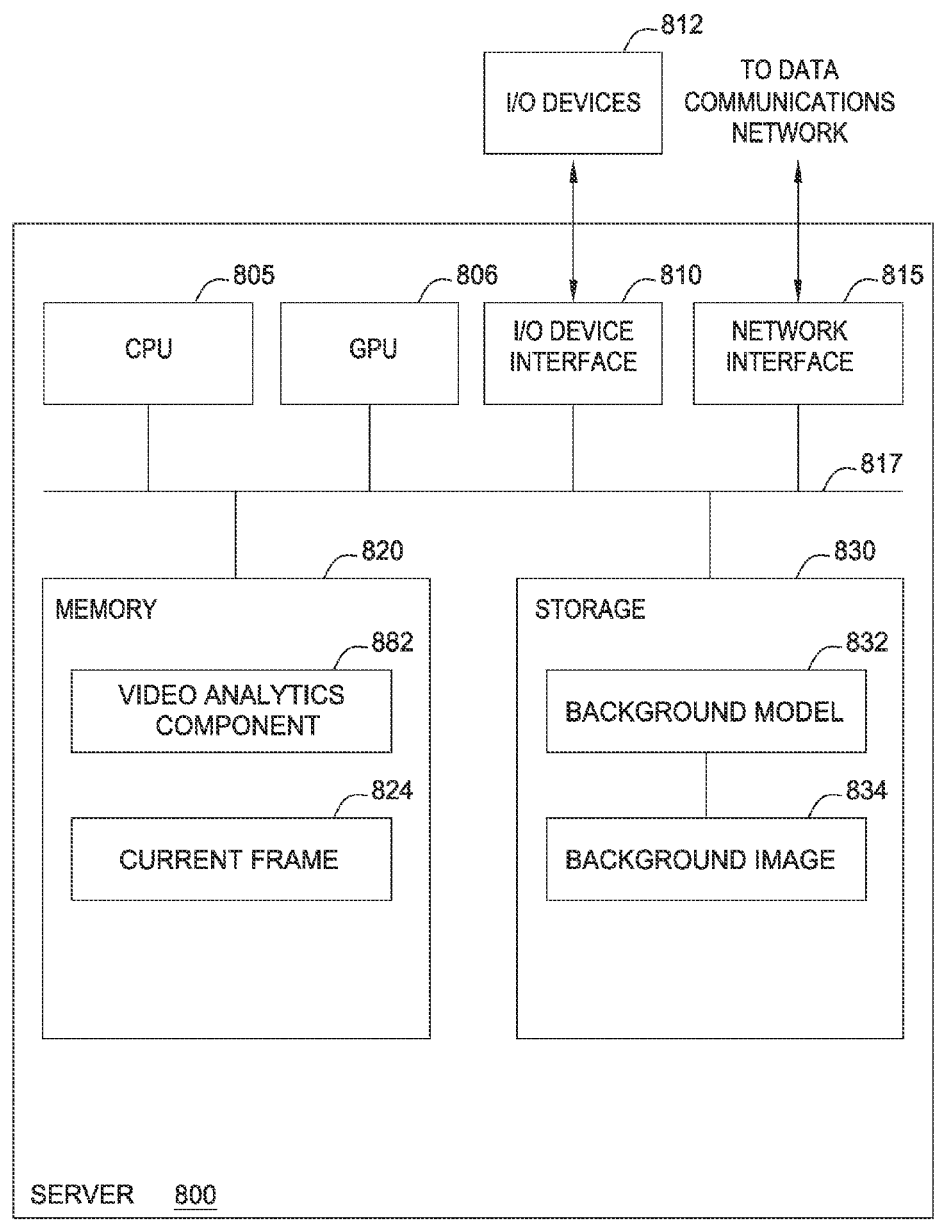
FIG. 8 illustrates an example of computing server which includes video analytics system, according to one embodiment of the invention.

FIG. 8 illustrates an example of computing server 800 which includes a video analytics component, according to one embodiment of the invention. As shown, the computing system 800 includes, without limitation, a central processing unit (CPU) 805, a graphics processing unit (GPU) 806, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 830. The interconnect 817 is used to transmit programming instructions and application data between the CPU 805, I/O devices interface 810, storage 830, network interface 815, and memory 820. Note, CPU 805 is included to be representative of a single CPU, multiple CPUs, a single CPU having multiple processing cores, and the like. And the memory 820 is generally included to be representative of a random access memory. The storage 830 may be a disk drive storage device. Although shown as a single unit, the storage 830 may be a combination of fixed and/or removable storage devices, such as fixed disc drives, removable memory cards, optical storage, network attached storage (NAS), or a storage area-network (SAN).

The graphics processing unit GPU 806 is a specialized integrated circuit designed to accelerate the image output in a frame buffer intended for output to a display. GPUs are very efficient at manipulating computer graphics and are generally more effective than general-purpose CPUs for algorithms where processing of large blocks of data is done in parallel.

In one embodiment, components of the BG/FG segmentation component discussed above may be implemented to process frames of a video stream in parallel on GPU 806. For example, the pixel based detector may be configured to generate the candidate background image using the GPU 806 to evaluate multiple pixels simultaneously. Similarly, the context based component may perform the normalized cross correlations on the GPU 806, as well as use the GPU 806 to update multiple pixels in the background model simultaneously (based on the classification of pixels as depicting foreground and background). Further, in addition to evaluating blocks of pixel data of the background image, background model and raw image on the GPU 806 in parallel, other components of the video analytics system may be implemented to execute on GPU 806 as well. For example, the micro feature classifier may determine the kinematics or appearance features of a foreground object using GPU 806 as well as generate elements of the feature vector in parallel. More generally, the video analytics component 822 may use GPU accelerated computing to accelerate the process of segmenting scene foreground and background in frames of streaming video. The resulting efficiency in processing pixel data on GPU 806 allows the server 800 to scale to support multiple camera feeds using a smaller hardware footprint.

Illustratively, the memory 820 includes a video analytics component 822 and a current frame 824 and storage 830 include a background model 832 and a background image 834. As discussed above, the video analytics component 822 may be configured to segment scene foreground from background in the current frame 824 using both a pixel based detector and a context based detector to determine a segmentation of scene foreground and background in frames of streaming video. Further still, the video analytics component 822 may maintain an accurate background model 832 by incrementally updating the mean and variance for pixels in the background model 832, absorbing foreground pixels into the background model 832 via an absorption window, and by dynamically updating background/foreground thresholds used by the pixel based component. Additionally, the background image 834 provides a representation of a scene absent any foreground objects that may change over time (1) as elements of scene foreground are absorbed by the background model 832 and (2) as background illumination gradually changes. Doing so collectively ensure that the video analytics component 822 can effectively and efficiently respond to changes in a scene, without overly increasing computational complexity.

Advantageously, using both a pixel based detector and a context based detector provides an effective technique for segmenting scene foreground from background in a video stream. Further, this approach can scale to process large numbers of camera feeds simultaneously, e.g., using parallel processing architectures.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Users can access any of the computing resources that reside in the cloud at any time, from anywhere across the Internet. For example, in context of this disclosure, a virtual server instance in a computing cloud could be configured to execute the video analytics components to process a streaming camera feed (or feeds). In such case, the computing resources could be scaled as needed as multiple camera feeds are added.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a background model of a scene depicted in a sequence of video frames captured by a video camera, the method comprising:
    receiving a video frame, wherein the video frame includes one or more appearance values for each of a plurality of pixels;
    classifying each pixel as depicting either foreground or background by comparing the one or more appearance values of each pixel to a background model of the scene; and
    performing one or more context based evaluations on one or more of the pixels classified as depicting foreground, wherein the context based evaluations selectively reclassifies one or more of the pixels as depicting foreground or background based on the classification of other pixels in the video frame as depicting either foreground or background.

2. The method of claim 1, wherein comparing the one or more appearance values of each pixel to a background model of the scene comprises:
    for each pixel of the plurality of pixels:
        determining a distance between the pixel and a corresponding pixel in the background model,
        upon determining the distance exceeds a threshold, classifying the pixel as depicting foreground, and
        upon determining the distance does not exceed the threshold, classifying the pixel as depicting background.

3. The method of claim 2, wherein the threshold is dynamically determined for each pixel based on a camera noise model.

4. The method of claim 2, wherein the background model provides, for each pixel in the video frame, a distribution modeling each of the one or more appearance values for the given pixel in the sequence of video frames and a respective mean and variance of each distribution.

5. The method of claim 4, further comprising, for each pixel classified as depicting background, updating the mean and variance of the distribution modeling the appearance values of that pixel based on the appearance values of the pixel in the video frame.

6. The method of claim 4, further comprising, for each pixel classified as depicting foreground, updating the mean of the distribution modeling the appearance values of that pixel based on the appearance values of the pixel in the video frame.

7. The method of claim 4, wherein the distance is a Mahalanobis distance.

8. The method of claim 1, wherein one of the context based evaluations comprises: dilating one or more of the pixels classified as depicting foreground and reclassifying, as foreground, one or more of the pixels classified as background with overlap with a specified number of the dilated pixels.

9. The method of claim 1, wherein one of the context based evaluations comprises eroding one or more contiguous groups of foreground pixels by reclassifying the pixels in the one or more contiguous groups as background.

10. The method of claim 1, wherein one of the context based evaluations comprises:
    identifying a contiguous region of pixels classified as foreground;
    determining a normalized cross correlation score between the contiguous region of pixels in the video game classified as foreground and a corresponding region of pixels in a background image of the background model; and
    upon determining the normalized cross correlation score satisfies a specified threshold, reclassifying the pixels in the contiguous region of pixels as depicting background.

11. A computer-readable storage medium containing a program, which when executed on a processor, performs an operation for generating a background model of a scene depicted in a sequence of video frames captured by a video camera, the operation comprising:
    receiving a video frame, wherein the video frame includes one or more appearance values for each of a plurality of pixels;
    classifying each pixel as depicting either foreground or background by comparing the one or more appearance values of each pixel to a background model of the scene; and
    performing one or more context based evaluations on one or more of the pixels classified as depicting foreground, wherein the context based evaluations selectively reclassifies one or more of the pixels as depicting foreground or background based on the classification of other pixels in the video frame as depicting either foreground or background.

12. The computer-readable storage medium of claim 11, wherein comparing the one or more appearance values of each pixel to a background model of the scene comprises:
    for each pixel of the plurality of pixels:
        determining a distance between the pixel and a corresponding pixel in the background model,
        upon determining the distance exceeds a threshold, classifying the pixel as depicting foreground, and upon determining the distance does not exceed the threshold, classifying the pixel as depicting background.

13. The computer-readable storage medium of claim 12, wherein the threshold is dynamically determined for each pixel based on a camera noise model.

14. The computer-readable storage medium of claim 12, wherein the background model provides, for each pixel in the video frame, a distribution modeling each of the one or more appearance values for the given pixel in the sequence of video frames and a respective mean and variance of each distribution.

15. The computer-readable storage medium of claim 14, wherein the operation further comprises, for each pixel classified as depicting background, updating the mean and variance of the distribution modeling the appearance values of that pixel based on the appearance values of the pixel in the video frame.

16. The computer-readable storage medium of claim 14, wherein the operation further comprises, for each pixel classified as depicting foreground, updating the mean of the distribution modeling the appearance values of that pixel based on the appearance values of the pixel in the video frame.

17. The computer-readable storage medium of claim 14, wherein the distance is a Mahalanobis distance.

18. The computer-readable storage medium of claim 11, wherein one of the context based evaluations comprises: dilating one or more of the pixels classified as depicting foreground and reclassifying, as foreground, one or more of the pixels classified as background with overlap with a specified number of the dilated pixels.

19. The computer-readable storage medium of claim 11, wherein one of the context based evaluations comprises eroding one or more contiguous groups of foreground pixels by reclassifying the pixels in the one or more contiguous groups as background.

20. The computer-readable storage medium of claim 11, wherein one of the context based evaluations comprises:
identifying a contiguous region of pixels classified as foreground;
determining a normalized cross correlation score between the contiguous region of pixels in the video game classified as foreground and a corresponding region of pixels in a background image of the background model; and
upon determining the normalized cross correlation score satisfies a specified threshold, reclassifying the pixels in the contiguous region of pixels as depicting background.

21. A system, comprising:
a video input source configured to provide a sequence of video frames, each depicting a scene;
a central processing unit (CPU);
a graphics processing unit (GPU); and
a memory containing a program, which, when executed on the CPU and GPU is configured to perform an operation for generating a background model of a scene depicted in a sequence of video frames captured by a video camera, the operation comprising:
receiving a video frame, wherein the video frame includes one or more appearance values for each of a plurality of pixels,
classifying each pixel as depicting either foreground or background by comparing the one or more appearance values of each pixel to a background model of the scene, and
performing one or more context based evaluations on one or more of the pixels classified as depicting foreground, wherein the context based evaluations selectively reclassifies one or more of the pixels as depicting foreground or background based on the classification of other pixels in the video frame as depicting either foreground or background.

22. The system medium of claim 21, wherein comparing the one or more appearance values of each pixel to a background model of the scene comprises:
for each pixel of the plurality of pixels:
determining a distance between the pixel and a corresponding pixel in the background model,
upon determining the distance exceeds a threshold, classifying the pixel as depicting foreground, and
upon determining the distance does not exceed the threshold, classifying the pixel as depicting background.

23. The system of claim 22, wherein the threshold is dynamically determined for each pixel based on a camera noise model.

24. The system of claim 22, wherein the background model provides, for each pixel in the video frame, a distribution modeling each of the one or more appearance values for the given pixel in the sequence of video frames and a respective mean and variance of each distribution.

25. The system of claim 24, wherein the operation further comprises, for each pixel classified as depicting background, updating the mean and variance of the distribution modeling the appearance values of that pixel based on the appearance values of the pixel in the video frame.

26. The system of claim 24, wherein the operation further comprises, for each pixel classified as depicting foreground, updating the mean of the distribution modeling the appearance values of that pixel based on the appearance values of the pixel in the video frame.

27. The system of claim 24, wherein the distance is a Mahalanobis distance.

28. The system of claim 21, wherein one of the context based evaluations comprises: dilating one or more of the pixels classified as depicting foreground and reclassifying, as foreground, one or more of the pixels classified as background with overlap with a specified number of the dilated pixels.

29. The system of claim 21, wherein one of the context based evaluations comprises eroding one or more contiguous groups of foreground pixels by reclassifying the pixels in the one or more contiguous groups as background.

30. The system of claim 21, wherein one of the context based evaluations comprises:
identifying a contiguous region of pixels classified as foreground;
determining a normalized cross correlation score between the contiguous region of pixels in the video game classified as foreground and a corresponding region of pixels in a background image of the background model; and
upon determining the normalized cross correlation score satisfies a specified threshold, reclassifying the pixels in the contiguous region of pixels as depicting background.

* * * * *